United States Patent [19]
Brun et al.

[11] Patent Number: 4,993,607
[45] Date of Patent: Feb. 19, 1991

[54] TRANSFER TUBE WITH INSITU HEATER

[75] Inventors: Milivoj K. Brun, Ballston Lake; Marcus P. Borom, Schenectady; Steven A. Miller, Amsterdam; Lawrence E. Szala; Paul S. Svec, both of Scotia, all of N.Y.

[73] Assignee: General Electric Company, Schenectady, N.Y.

[21] Appl. No.: 513,124

[22] Filed: Apr. 23, 1990

Related U.S. Application Data

[62] Division of Ser. No. 377,387, Jul. 10, 1989.

[51] Int. Cl.[5] .......................................... B22D 35/06
[52] U.S. Cl. ................................. 222/590; 222/593; 222/606; 106/38.9
[58] Field of Search ............... 222/590, 591, 603, 606, 222/607, 593; 266/236; 106/38.9

[56] References Cited

U.S. PATENT DOCUMENTS

| | | | |
|---|---|---|---|
| 797,632 | 8/1905 | Stroh | 411/178 |
| 3,651,098 | 3/1972 | Rocher | 222/603 |
| 4,131,475 | 12/1978 | Svec | 106/38.9 |
| 4,247,333 | 1/1981 | Ledder et al. | 106/38.9 |
| 4,923,225 | 5/1990 | Lührsen et al. | 222/607 |

*Primary Examiner*—S. Kastler
*Attorney, Agent, or Firm*—Jane M. Binkowski; James C. Davis, Jr.; James Magee, Jr.

[57] ABSTRACT

An integral transfer tube is produced comprised of a hollow high density ceramic oxide tube having its outer surface wall surrounded by a low density ceramic oxide shell, and having a heating element comprised of a heating wound portion and two end portions wherein the wound portion is intermediate the tube and the shell, and wherein at least a sufficient amount of the end portions are exposed for electrical attachment.

19 Claims, 8 Drawing Sheets

TRANSFER TUBE WITH INSITU HEATER

This application is a division, of application Ser. No. 07/377,387, filed 07/10/89.

This invention relates to the production of a transfer tube comprised of a high density ceramic oxide tube having directly bonded to its outer surface wall a low density ceramic oxide covering and having a heating element intermediate the high density tube and low density covering.

This application is related to U.S. Ser. No. 339,460, filed on Apr. 17, 1989, for TRANSFER TUBE, for Borom et al., and U.S. Ser. No. (RD-19,237) filed on or about June 15, 1989, for TRANSFER TUBE, for Svec et al., which are assigned to the assignee hereof and incorporated herein by reference.

In the past, because of their chemical inertness and resistance to thermal shock, low density tubes of alumina and zirconia have been used to transfer molten metal. One disadvantage of the low density tubes is that they are mechanically weak and fragments, which are very deleterious to the properties of the bulk metal, crack off and enter the passing stream of molten metal. Frequently, the low density tubes break up. Also, the low density tubes have rough surfaces which provide very high specific surface areas where oxides and slag can adhere and ultimately block the orifices. On the other hand, high density tubes are not useful because of their poor thermal shock resistance.

The disadvantages of the prior art are overcome by related U.S. Ser. No. 07/339,460 which discloses an integral transfer tube comprised of high density ceramic oxide having directly bonded to its outer surface wall a low density ceramic oxide shell. The construction of this transfer tube imparts thermal shock resistance to it. However, it was found that thermal shock resistance was enhanced by pre-heating of the transfer tube. Delivery of heat to the transfer tube by heat sources from the outside is both cumbersome and undesirable from the standpoint of the sign of the radial thermal gradient. A thermal gradient with temperature decreasing from the outside inward places the internal high density tube in an undesirable state of triaxial tension.

It is desirable to create a configuration which delivers pre-heat at the interior of the transfer tube and radiates it outward.

The object of the invention is to enhance the thermal shock resistance of a composite transfer tube by providing a source of pre-heat that is internal to the structure. The present transfer tube is produced by a sintering process.

The present invention provides an integral transfer tube comprised of a high density hollow ceramic oxide tube with its outer surface wall preferably enveloped by a low density ceramic oxide shell and having an internal heater between the high density tube and the low density shell. The internal heater is provided by a heating element and is characterized as able to generate sufficient heat to the high density tube component to prevent significant deleterious effect thereon at the temperature of use of the transfer tube. Thermal shock resistance needed to survive the transient thermal gradients in the high density tube generated by the introduction of molten metal is provided by pre-heating the high density tube using the internal heater. The low density shell has a thermal conductivity sufficiently lower than that of the high density tube to prevent build-up of thermal stresses in the high density tube that would have a significantly deleterious effect on it. Also, the high density tube in the present transfer tube provides a smooth, or substantially smooth, inner surface thereby eliminating or significantly reducing adherence of oxide or slag.

Those skilled in the art will gain a further and better understanding of the present invention from the detailed description set forth below, considered in conjunction with the figures accompanying and forming a part of the specification in which.

Figure 1:
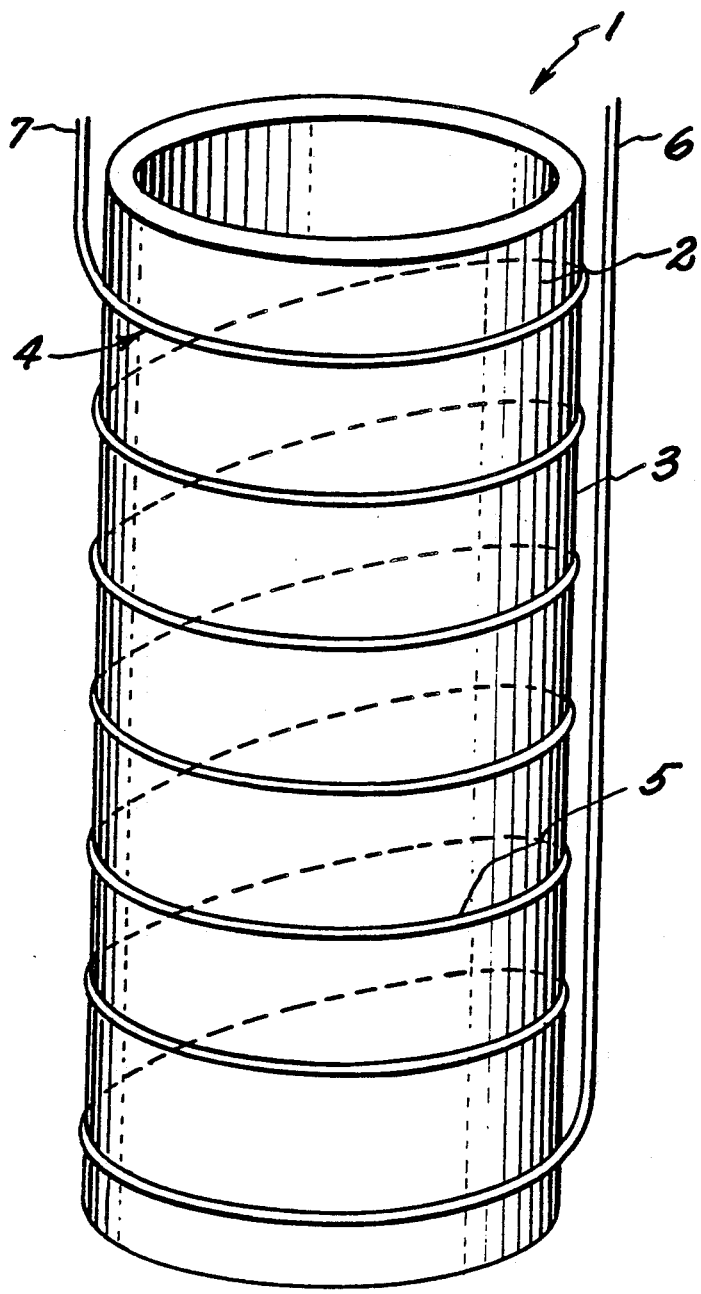
FIG. 1 illustrates a side elevational view of one embodiment of a structure, before formation of the low density shell thereon to produce the present transfer tube, comprised of the high density hollow tube and a continuous elongated heating element with its wound portion on the wall of the high density tube in the form of a single helix.
Figure 2:
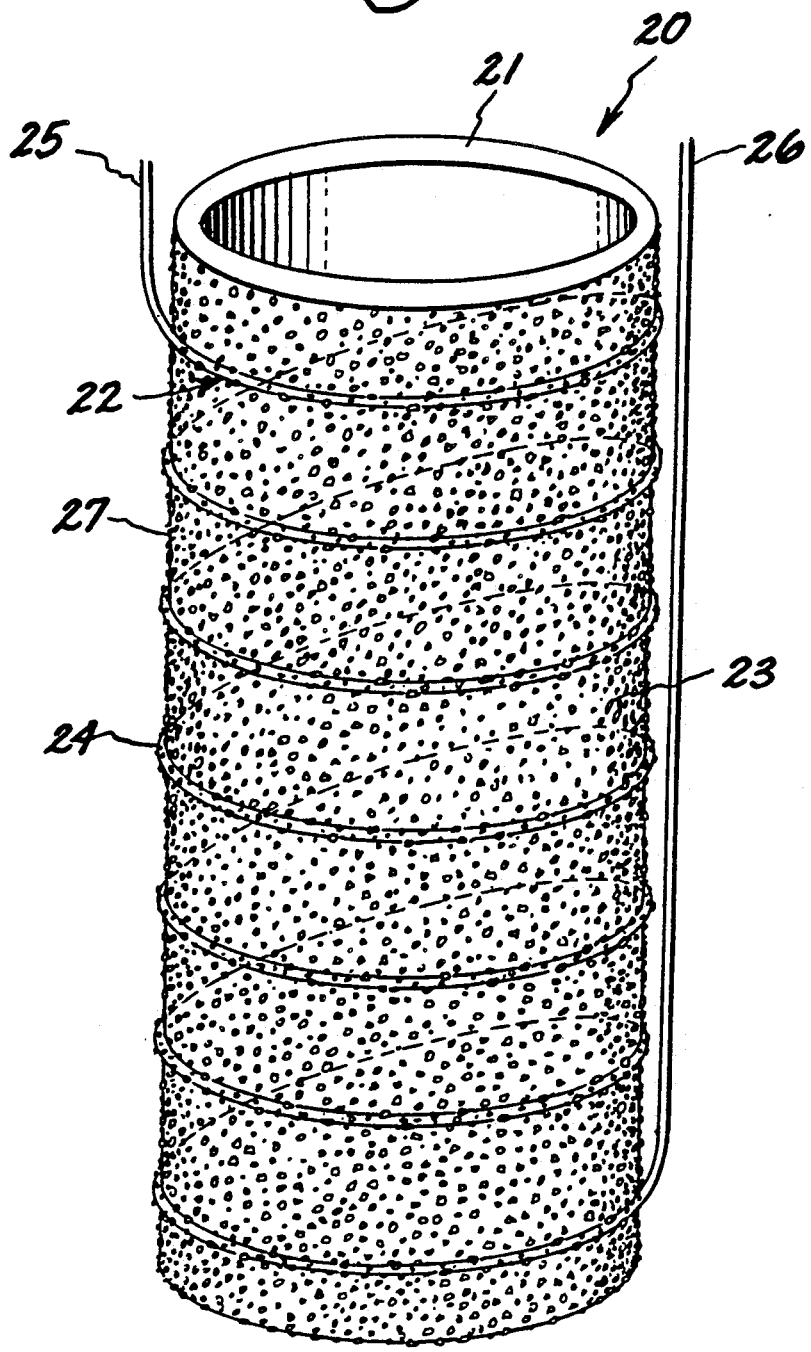
FIG. 2 illustrates a side elevational view of another embodiment of a structure, before formation of the low density shell thereon, comprised of the high density hollow tube, a continuous elongated heating element and a cementing coating of ceramic oxide particles utilized to maintain the wound portion of the heating element in place on the wall of the high density tube.
Figure 3:
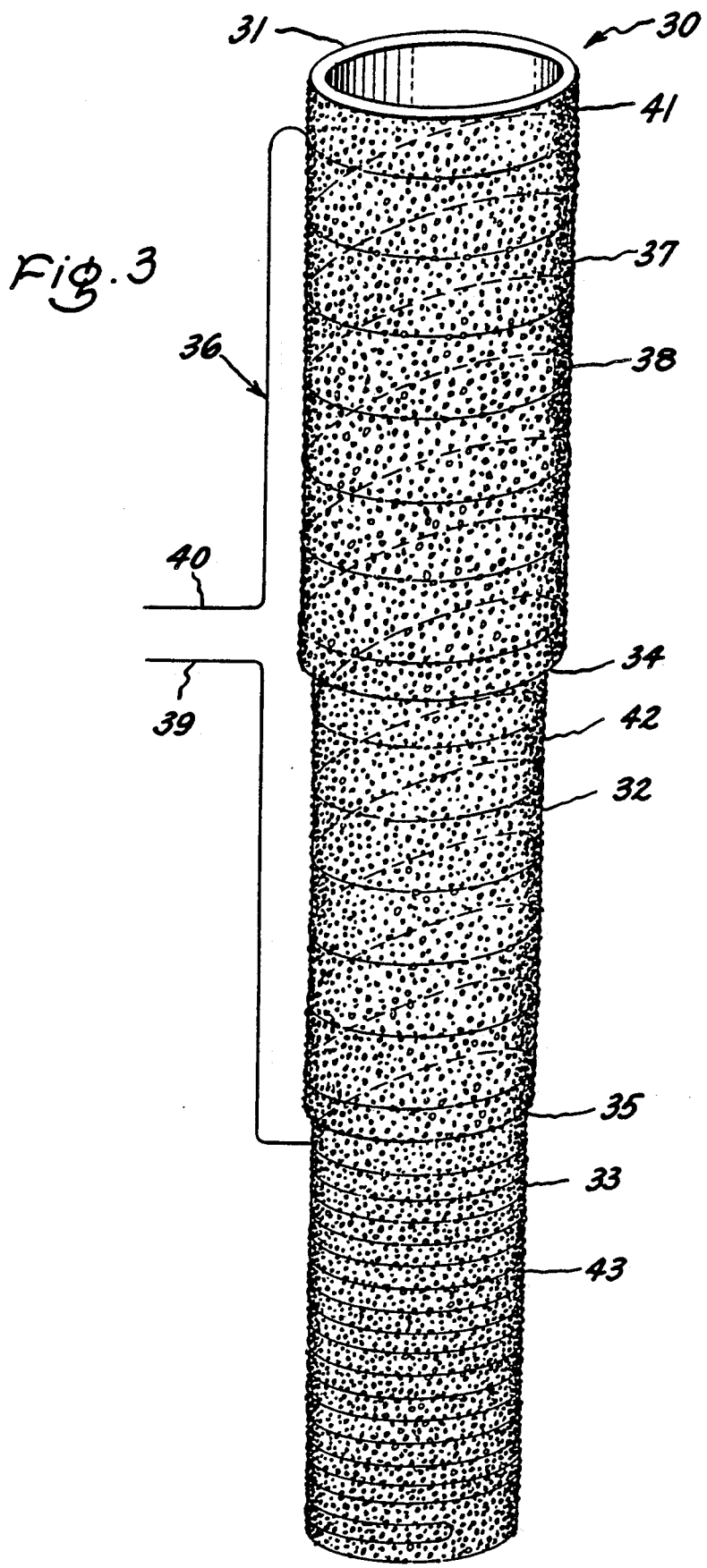
Figure 4:
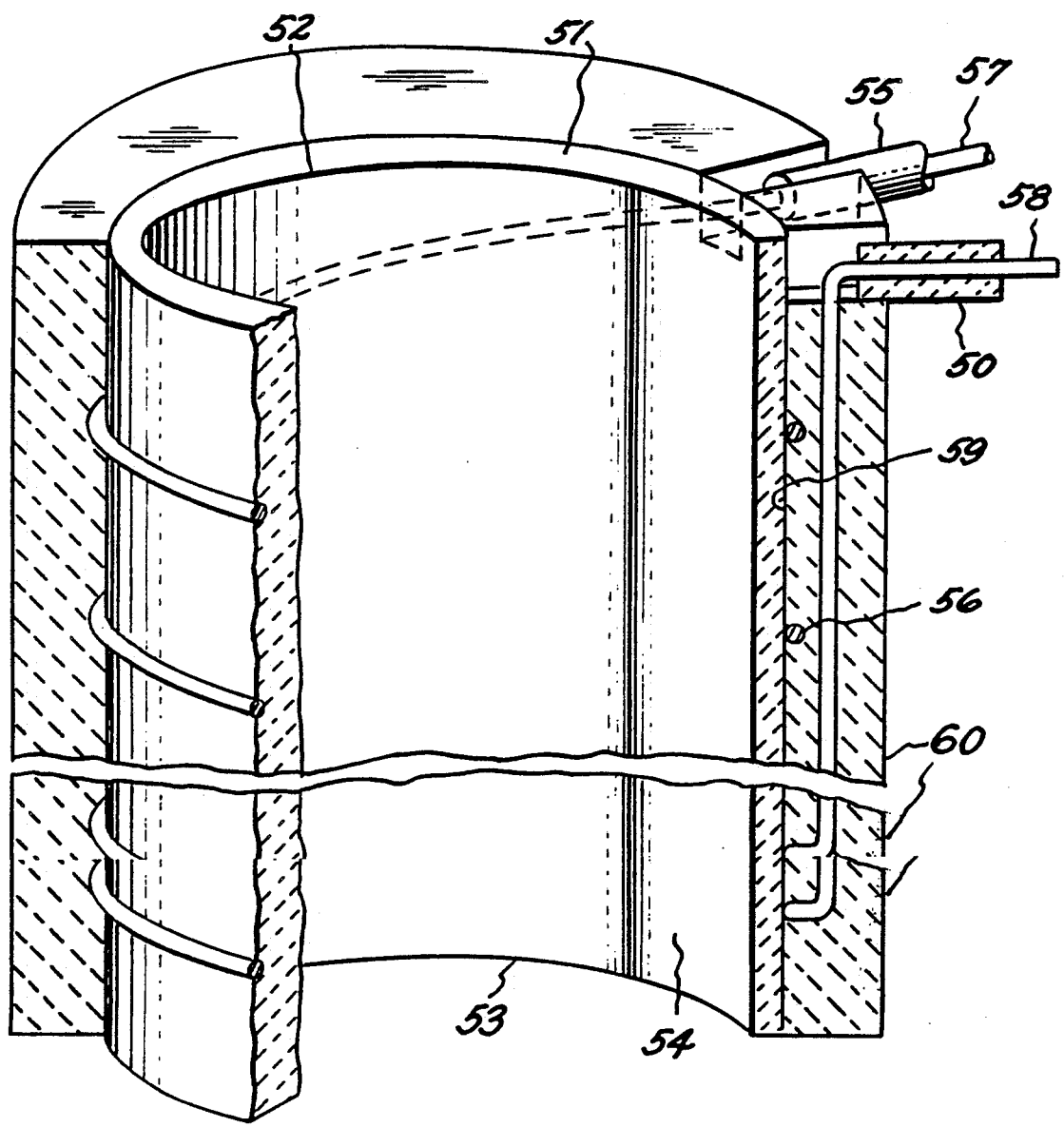
Figure 5:
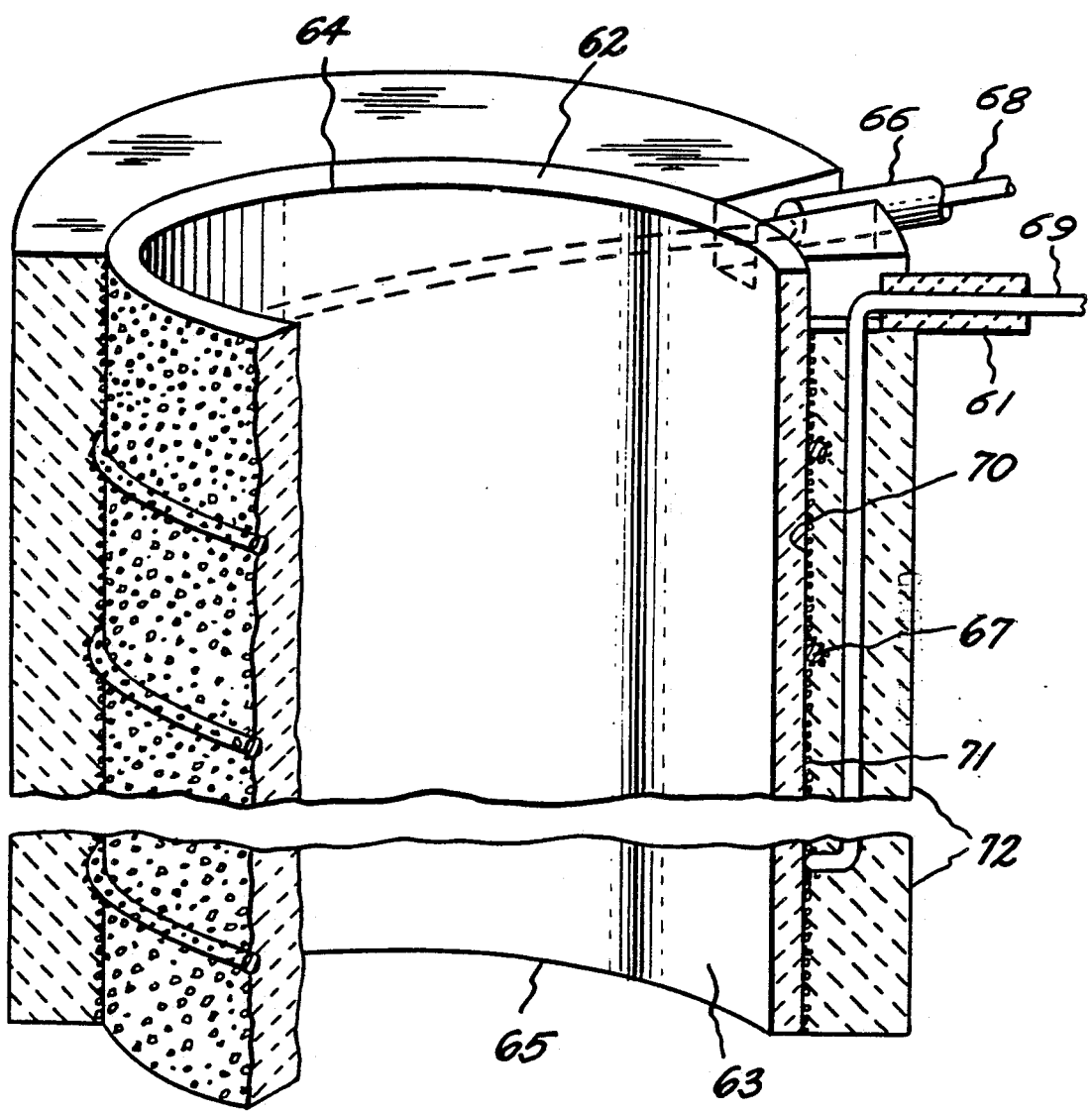
Figure 6:
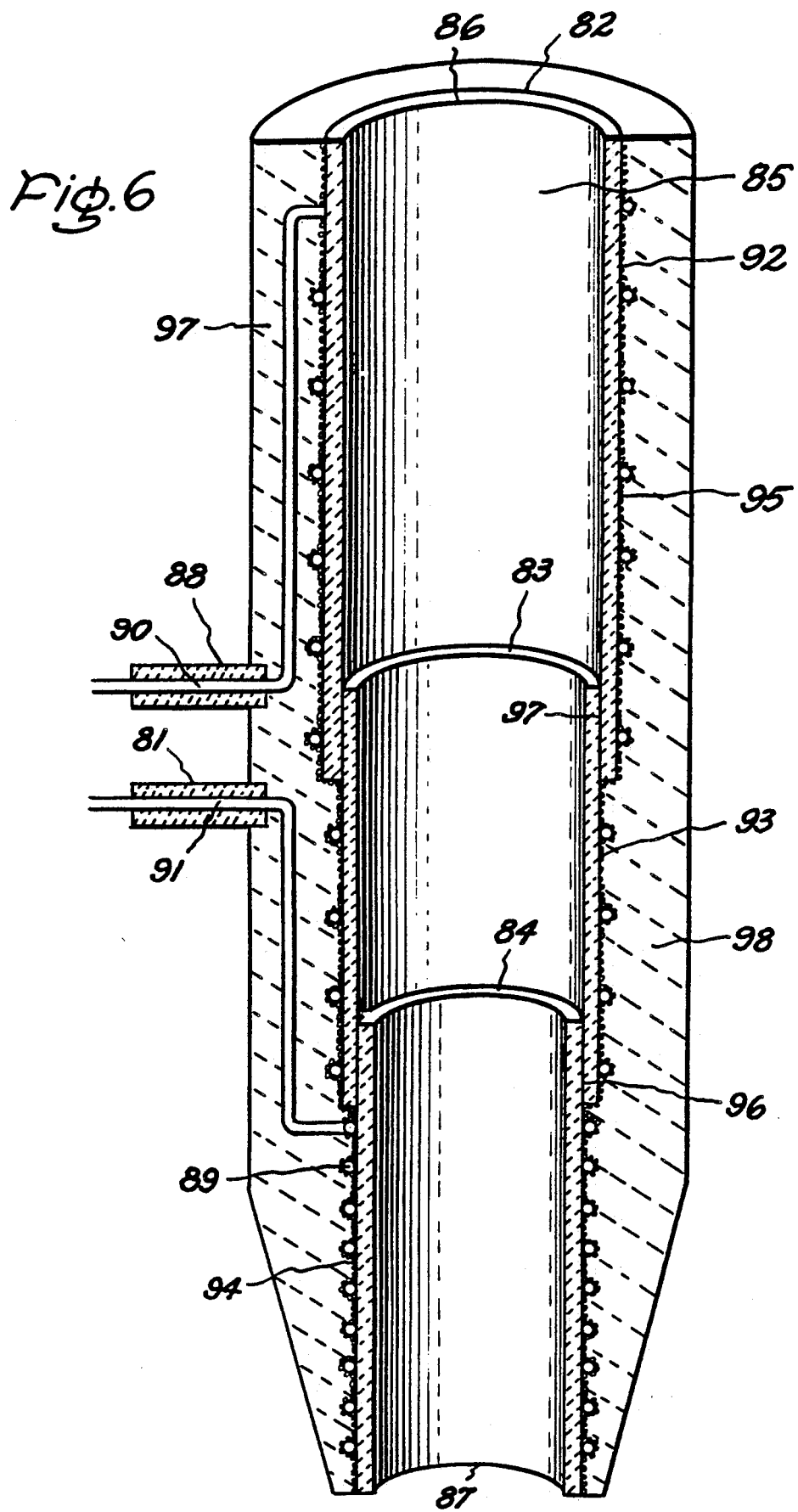
Figure 7:
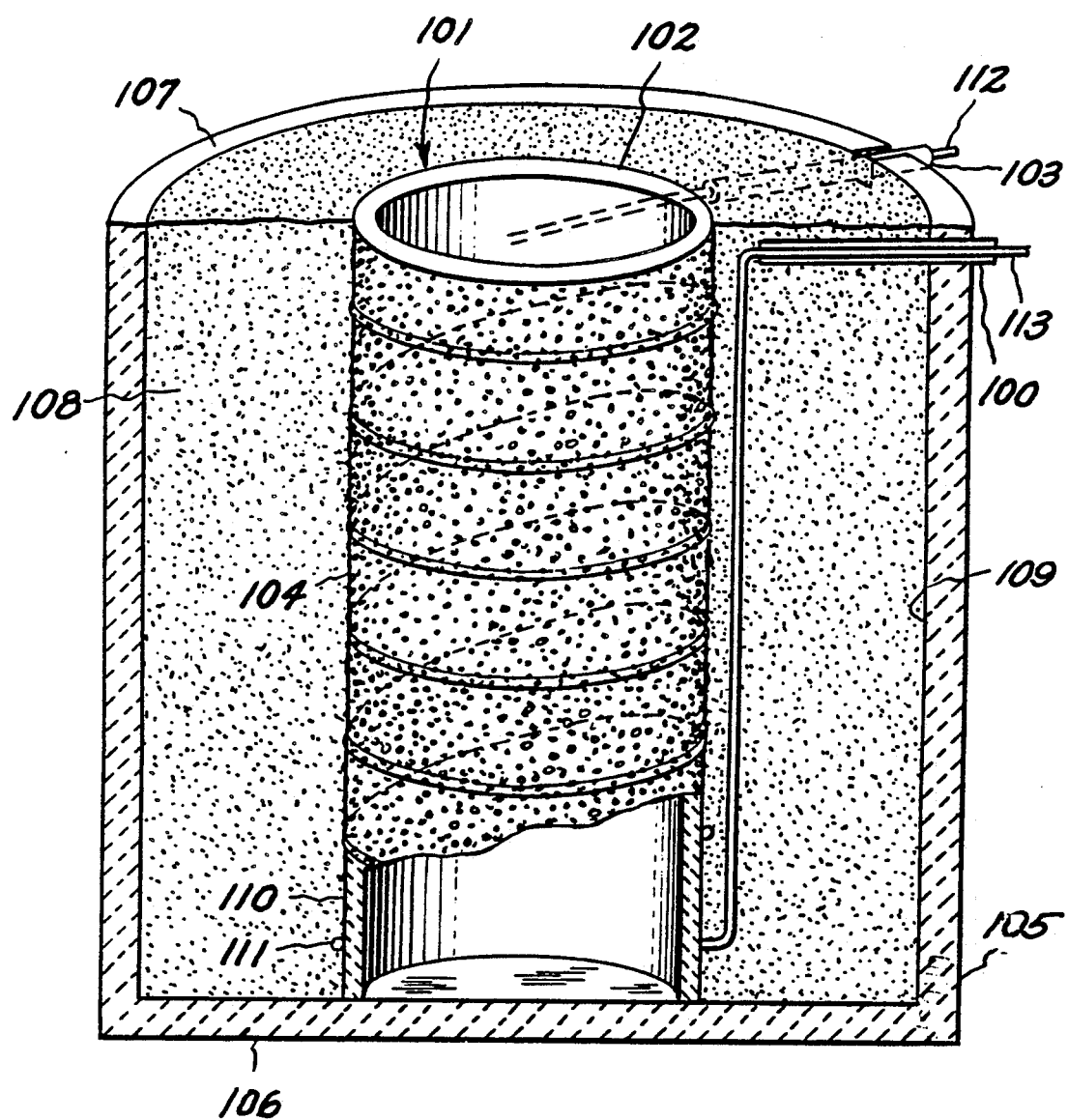
Figure 8:
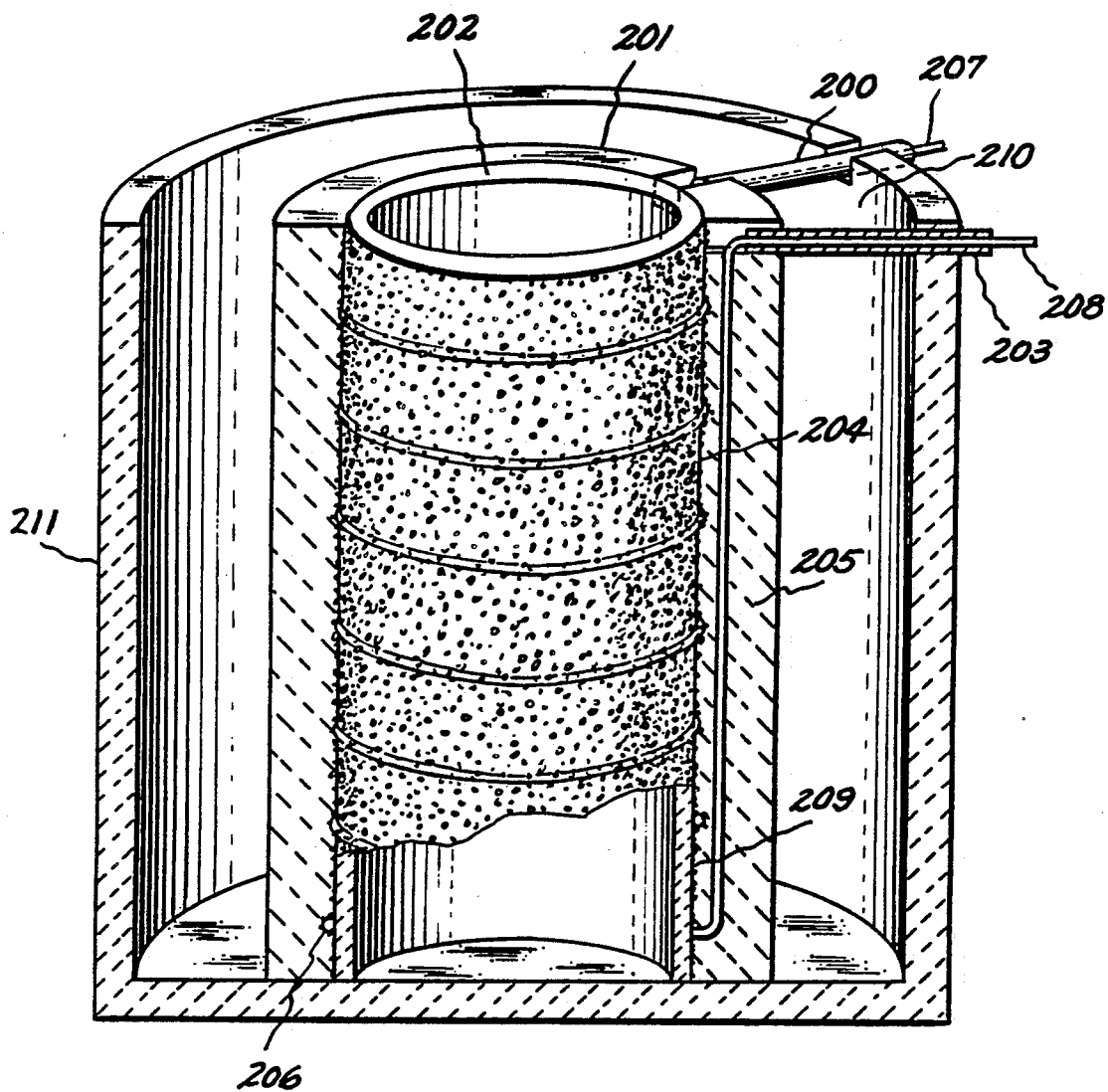

FIG. 3 illustrates a side elevational of another embodiment of a structure, before formation of the low density shell thereon, comprised of three high density tubes fitted partly within each other by frictional engagement, a continuous heating element, wherein the wound portion of the heating element on the smallest diameter tube, i.e. the bottom tube, is in the form of a double helix and on the upper two tubes it is in the form of a single helix, and wherein the wound portion of the heating element is secured in place by a coating of cementing ceramic oxide particles;

FIG. 4 illustrates a cross-sectional view of one embodiment of the present transfer tube formed with the structure of FIG. 1;

FIG. 5 shows a cross-sectional view of another embodiment of the present transfer tube formed with the structure of FIG. 2;

FIG. 6 shows a cross-sectional view of another embodiment of the present transfer tube formed with the structure of FIG. 3;

FIG. 7 shows the cross-section of one embodiment of an assembly useful for carrying out the processing useful for producing the present transfer tube shown in FIG. 5; and FIG. 8 shows the assembly of FIG. 7 and sintering has been carried out to produce the present transfer tube of FIG. 5.

Briefly stated, in one embodiment, the present transfer tube is comprised of a hollow high density tube, a low density shell, and a continuous elongated heating element comprised of a heating wound portion and two end portions, said wound portion of said heating element being in direct contact with the outer surface wall of said high density tube, said shell surrounding said wound portion of said heating elements and the outer surface wall of said high density tube leaving no significant portion thereof exposed, said shell being in direct contact with said wound portion of said heating element and being directly bonded to said outer surface wall of said high density tube, at least a sufficient amount of said end portions of said heating element being exposed for electrical attachment or electrical contact, said heating wound portion of said heating element being electrically characterized as having an electrical resistance and a surface area sufficient to preheat and maintain said high density tube at a temperature within 300° C. of the temperature of use of said transfer tube, said heating element being comprised of a metal or metal alloy having a melting point higher than 700° C. and at least 200° C. higher than the temperature of use of said transfer tube, said high density tube and low density shell being comprised of polycrystalline ceramic oxide material, said high density tube having a density of at least about 90% of its theoretical density, said high density tube having a passageway extending through its length with a cross-sectional area at least sufficient for transfer of molten metal therethrough, said low density shell ranging in density from about 40% to about 80% of its theoretical density, said low density shell having a thermal conductivity at least about 10% lower than that of said high density tube, said low density shell having a thermal expansion coefficient within about ±25% of the thermal expansion coefficient of said high density tube.

In another embodiment, the present transfer tube also contains a polycrystalline ceramic oxide sintered coating which is in direct contact with the wound portion of the heating element and which is directly bonded to the outer surface wall of the high density tube. In this embodiment, the shell is directly bonded to the polycrystalline coating. This polycrystalline sintered coating is produced from a coating of a slurry of cementing ceramic oxide particles deposited on the wound portion of the heating element and on the outer surface wall of the high density tube to maintain the wound portion of the heating element in place.

In another embodiment, part of the end wire portions of the heating element are sleeved with polycrystalline ceramic oxide and at least one end portion of each sleeve is contained within the shell and is directly bonded to the shell of the transfer tube.

The term "metal" herein includes metal alloys, particularly superalloys.

FIG. 1 shows structure 1, before a shell is produced thereon by the present sintering process, comprised of high density ceramic oxide tube 2 and a continuous elongated heating element in the form of a wire 4 comprised of a heating wound portion 5 and end portions 6 and 7. Wound portion 5 is in the form of a single helix frictionally engaged in direct contact with outer wall 3 of high density tube 2. Wire end portion 6 is bent and spaced from wound portion 5 to extend outwardly n the same direction as wire end portion 7. Spacing of wire end portion 6 from wire wound portion 5 can be maintained in a known manner to prevent an electrical short in the resulting transfer tube. Wire end portions 6 and 7 are arranged for at least a sufficient amount thereof to be exposed in the resulting transfer tube for electrical attachment.

FIG. 2 shows structure 20, before it is subjected to the present sintering process, comprised of high density ceramic oxide tube 21, a heating element 22 in the form of a wire and an unsintered cementing coating 23 comprised of ceramic oxide particles. Heating element 22 is comprised of a heating wound wire portion 24 and end wire portions 25 and 26. Wound wire portion 24 is in the form of a single helix in direct contact with outer surface wall 27 of high density tube 21. End wire portion 26 is bent and spaced from wound portion 24 to extend outwardly in the same direction as end wire portion 25. Coating 23 prevents contact between end wire portion 26 and wound portion 24 thereby preventing an electrical short in the resulting transfer tube. Coating 23 covers and is in direct contact with wound wire portion 24 and wall 27 maintaining wound wire portion 24 in place preventing contact between the coils of the helix 24 thereby preventing an electrical short in the resulting transfer tube. End wire portions 25 and 26 are arranged for at least a sufficient amount thereof to be exposed in the resulting transfer tube for electrical attachment thereto.

FIG. 3 shows structure 30, before the present shell is formed thereon by sintering, comprised of high density ceramic oxide tubes 31, 32 and 33 frictionally joined partly within each other at joints 34 and 35, a heating element 36 in the form of a wire and a coating 37 comprised of cementing ceramic oxide particles. Heating element 36 is comprised of a heating wound wire portion 38 and end wire portions 39 and 40. Wound wire portion 38, shown on tube 33 in the form of a double helix and on tubes 31 and 32 in the form of a single helix, is in direct contact with outer surface walls 41, 42 and 43 of tubes 31, 32 and 33, respectively. End wire portion 39 and 40 are bent and spaced from wound portion 38 to extend outwardly in the same direction. Coating 37 is in direct contact with wound wire portion 38 and walls 41, 42 and 43 maintaining wound wire portion 38 in place preventing contact between the coils thereof and also preventing contact between wire portion 38 and end portions 39 and 40, thereby preventing an electrical short in the resulting transfer tube. End wire portions 39 and 40 are arranged for at least a sufficient amount thereof to be exposed in the resulting transfer tube for electrical attachment.

FIG. 4 shows one embodiment of the present transfer tube produced with the structure of FIG. 1. Specifically, FIG. 4 shows high density ceramic oxide tube 51 which is open at both its upper end portion 52, i.e. the entrance end for the molten metal, and its lower end portion 53, i.e. the exit end for the molten metal. Passageway 54 extends through tube 51, and in this embodiment, passageway 54 has the same circular cross-sectional area throughout its length. The heating element is in the form of wire comprised of wound portion 56 and end portions 57 and 58. Wound wire portion 56 is in direct contact with outer surface wall 59 of high density tube 51. End wire portion 58 is bent and spaced from wound wire portion 56 . Low density ceramic oxide shell 60 is directly bonded to the outer surface wall 59 of high density tube 51 except for those portions of wall 59 occupied by wound wire portion 56. Shell 60 is in direct contact with wound wire portion 56 and surrounds wire portion 56 and wall 59 leaving no significant portion thereof exposed. End wire portions 57 and 58 are exposed sufficiently for electrical attachment. Part of end wire portions 57 and 58 are sleeved with polycrystalline ceramic oxide sleeves 55 and 50. An end portion of sleeves 55 and 50 is within and directly bonded to shell 60.

FIG. 5 shows a transfer tube produced with the structure of FIG. 2. Specifically, FIG. 5 shows high density ceramic oxide tube 62 with passageway 63 which is open at both its upper end portion 64 through which the molten metal enters the tube, and its lower end portion 65 through which the molten metal exits the tube. The heating element is in the form of a wire comprised of a helically wound wire portion 67 and end portions 68 and 69. Wound wire portion 67 is in direct contact with outer surface wall 70 of high density tube 62. End wire portions 68 and 69 extend away from transfer tube 61 for electrical attachment thereto. Part of end wire portions 68 and 69 are sleeved with polycrystalline ceramic oxide sleeves 61 and 66. An end portion of sleeves 61 and 66 is within and directly bonded to shell 72. Sintered polycrystalline coating 71, formed from the cementing ceramic oxide particles, is directly bonded to outer wall 70 and is in direct contact with helically wound portion 67. Low density ceramic oxide shell 72 is directly bonded to coating 71.

FIG. 6 shows a transfer tube produced with the structure of FIG. 3. Specifically, FIG. 6 shows high density ceramic oxide tubes 82, 83 and 84 fitted partly within one another at joints 96 and 97 with passageway 85 extending therethrough which is open at both its upper end portion 86 through which the molten metal enters the transfer tube, and its lower end portion 87 through which the molten metal exits the tube. The heating element is a wire comprised of a helically wound portion 89 and end portions 90 and 91. Wound wire portion 89 is in direct contact with outer surface walls 92, 93 and 94 of high density tubes 82, 83 and 84, respectively. End wire portions 90 and 91 are sufficiently exposed for electrical attachment thereto. Sintered polycrystalline coating 95, formed from the cementing ceramic oxide particles, is directly bonded to outer walls 92, 93 and 94 and is in direct contact with helically wound portion 89. Low density ceramic oxide shell is directly bonded to coating 95. FIG. 6 shows end wire portions 90 and 91 folded back to extend outwardly in the same direction. Part of the end wire portions 90 and 91 are sleeved with polycrystalline alumina sleeves 81 and 88. An end portion of sleeves 81 and 88 is within and directly bonded to shell 97.

In the present transfer tube, the high density tube is a hollow body with two open ends, i.e. an entrance end and an exit end. It has a passageway extending throughout its length, i.e. through both open ends. The cross-sectional area of the passageway is at least sufficient to permit the passage of a molten metal downwardly therethrough. The particular cross-sectional area of the passageway depends largely on the particular application of the transfer tube and is determined empirically. Generally, the cross-sectional area of the passageway ranges from about 0.8 to about 5000 square millimeters, frequently from about 3 to about 1500 square millimeters or from about 7 to about 1000 square millimeters. The cross-sectional area can be the same, or it can vary, through the length of the passageway.

The high density tube, as well as the passageway extending therethrough, can be in any desired shape. For example, the cross-sectional area of the passageway can be in the shape of a circle, a square, an oval, a rectangle, a star, and any combination thereof. The outer wall of the high density tube can be flat but preferably it is curved. For example, the high density tube can be in the form of a cylinder, rectangle, or a square. Preferably, the high density tube, including its passageway, is cylindrical in shape.

The high density tube has a minimum wall thickness which depends largely on the application of the transfer tube and is determined empirically. Generally, the high density tube has at least a wall thickness which is sufficient to maintain, or substantially maintain, its integrity in the transfer tube when molten metal is passed therethrough. Generally, the wall thickness of the high density tube ranges from about 0.125 millimeters to less than about 6.5 millimeters, frequently from about 0.250 millimeters to about 2 millimeters, or from about 0.700 millimeters to about 1.500 millimeters. Generally, a high density tube with a wall thickness greater than about 6.5 millimeters provides no advantage.

The high density tube has a length which can vary widely depending largely on the application of the transfer tube and is determined empirically. It has a length at least sufficient for transfer of molten metal therethrough. It can be as long as desired. Generally, its length ranges from about 15 millimeters to about 1000 millimeters, and frequently, it ranges from about 25 millimeters to about 200 millimeters. For example, when the transfer tube is used as an orifice, its length generally ranges from about 25 millimeters to about 100 millimeters.

Generally, the high density tube ranges in density from about 90% to about 100%, preferably from about 95% to about 100%, of its theoretical density. The particular density depends largely on the particular application of the transfer tube and is determined empirically. Preferably, porosity in the high density tube is non-interconnecting.

The average grain size of the high density tube may vary depending largely on the particular application of the transfer tube and is determined empirically. Preferably, the average grain size of the high density tube is sufficiently small to prevent cracking off, or significant cracking off, of fragments of the tube when contacted by passing molten metal at the particular temperatures used. Generally, the average grain size of the high density tube ranges from about 5 microns to about 50 microns, or from about 10 microns to about 40 microns, or from about 20 microns to about 30 microns.

The chemical composition of the high density ceramic oxide tube depends largely on the particular application of the transfer tube and is determined empirically. The high density tube is comprised of polycrystalline ceramic oxide material which is chemically inert, or substantially chemically inert, with respect to the molten material to be passed therethrough. Specifically, it should have no significant deleterious effect on the molten metal passed therethrough.

Preferably, the high density tube is comprised of a ceramic oxide material selected from the group consisting of alumina, beryllia, magnesia, magnesium aluminate, mullite, yttria, zirconia, and mixtures thereof. Generally, the zirconia is known in the art as stabilized zirconia which generally is comprised of the cubic structure, or a combination of cubic, monoclinic and tetragonal structures.

The high density tube may be available commercially. It also can be produced by a number of conventional techniques known in the ceramics art. In a preferred technique, sinterable ceramic oxide particulate material is shaped into the desired form of hollow tube having dimensions which on densification will produce the desired high density tube and is sintered in a gaseous atmosphere or a partial vacuum at a temperature at which it will densify to the desired density. Particulate size of the sinterable material is determinable empirically and depends largely on the grain size desired in the high density tube. Generally, the sinterable material has an average particle size of less than 5 microns. Also, the sinterable particulate material can vary widely in composition depending largely on the particular high density tube desired. For example, it may be comprised of ceramic oxide powder alone, or of a mixture of the ceramic oxide powder and a sufficient amount of a sintering agent therefor determined empirically. The sinterable zirconia material would include a stabilizing agent therefor in an effective amount as is well-known in the art to produce generally the cubic structure, or a combination of cubic, monoclinic and tetragonal structures. In a specific example, alumina powder having a average particle size of about 4 microns can be shaped into a tube and sintered in argon at about atmospheric pressure at about 1700° C. to produce the present high density tube.

The high density tube has a thermal expansion coefficient which depends largely on the particular transfer tube desired and its application and is determined empirically. Generally, the high density tube has a thermal expansion coefficient greater than about $40 \times 10^{-7}/°C.$, frequently greater than about $65 \times 10^{-7}/°C.$, and more frequently it is about $90 \times 10^{-7}/°C.$ The present heating element is comprised of a solid metal or metal alloy which has a melting point higher than 700° C., preferably higher than 1000° C., and more preferably higher than 1800° C. Also, the heating element should have a melting point at least 200° C., preferably at least 300° C., higher than the temperature of use of the transfer tube. Preferably, the heating element is comprised of a member selected from the group consisting of chromium, iridium, molybdenum, nickel, osmium, palladium, platinum, rhodium, ruthenium, tantalum, tungsten and alloys thereof. More preferably, because of their high melting points, the heating element is comprised of molybdenum, tantalum or tungsten.

The metal or metal alloy of which the heating element is comprised can contain one or more dopants to impart a desired property thereto as is known in the art. For example, molybdenum or tungsten are frequently doped with potassium to impart ductility thereto.

The present heating element is elongated and can be in any convenient form. For example, it can be in the form of a wire, a ribbon, a hollow tube and any combination thereof. Generally, the heating element is in the form of a wire.

The particular dimensions of the heating element are determined empirically and depend largely on the dimensions of the high density tube and the particular use of the resulting transfer tube. Generally, the smaller the diameter of the high density tube, the smaller is the thickness of the heating element due to the geometric constraint of the high density tube and the more concentrated windings of the heating element which may be required to generate the desired heat. Generally, the heating element ranges in thickness from about 0.25 mm (10 mils) to 3.7 mm (150 mils), frequently from about 0.5 mm (20 mils) to about 0.7 mm (30 mils), and preferably it is about 0.5 mm (20 mils).

The heating element is comprised of a wound portion and two end portions wherein the wound portion is comprised of spaced windings, generally coils, in direct contact with the outer wall of the high density tube. Spacing of the windings depends largely on the particular application of the transfer tube. Also, spacing between the windings and between the wound portion and end portions of the heating element should be sufficient to prevent contact therebetween which would result in electrical failure of the element in the transfer tube.

A number of techniques can be used to produce the structure comprised of the present spaced heating element and high density tube. In one technique, the required amount of heating element is wound directly on the outside wall of the high density tube. Spacing of the coils can be maintained by their frictional engagement with the wall of the high density tube as shown in FIG. 1. Preferably, the required amount of heating element is initially wound tightly directly on a steel mandrel having a slightly smaller outside diameter than the high density tube, and slid from the mandrel onto the high density tube. Generally, the heating element or wire has sufficient spring to enable a snug fit of the wound portion against the wall of the high density tube.

In another technique, a polymer solution or latex is coated in a conventional manner on the wound portion of the heating element and on the outer wall of the high density tube which on drying leaves a polymer coating securing the heating element in place. The polymer should thermally decompose and vaporize away leaving no significant elemental carbon below 800° C. Representative of useful polymers is epoxy, polyvinyl alcohol, and polymethylmethacrylate.

In a preferred embodiment, a coating of cementing ceramic oxide particles is used to maintain the required spacing of the heating element. The particular composition of these ceramic oxide particles depends largely on their cementing action and the particular use of the resulting transfer tube and is determined empirically. The cementing particles should have no significant deleterious effect in the present process or on the resulting transfer tube. The cementing ceramic oxide particles should sinter in the present process to become directly bonded to the outside wall of the high density tube with which they are in contact as well as to the shell. Generally, more than about 95%, frequently about 100%, by weight of the cementing particles is selected from the group consisting of alumina, beryllia, magnesia, magnesium aluminate, magnesium aluminate-forming compositions of magnesia and alumina, mullite, mullite-forming compositions of alumina and silica, yttria, zirconia and mixtures thereof. Generally, less than about 5% by weight of the cementing particles is selected from the group consisting of calcium oxide, magnesium oxide, silica, and any combinations thereof. Generally, the cementing particles are relatively coarse generally ranging in size from about 1 to about 125 microns generally with an average particle size ranging from about 50 to about 100 microns. The cementing particulate composition may be available commercially.

Generally, a slurry of the cementing particles is used which can be produced in a conventional manner in a liquid medium which has no significant deleterious effect thereon, and preferably it is an aqueous slurry. Preferably, the concentration of the slurry is sufficient to produce a wet coating of the particles which on drying leaves sufficient coating of oxide particles to secure the spacing. Generally, the solids content of the slurry ranges from about 20% to about 50% by volume of the slurry. A coating of the slurry can be applied in a conventional manner such as, for example, by brushing it on and generally it is dried in air.

In the present transfer tube, the wound portion of the heating element is electrically characterized as having an electrical resistance and a surface area sufficient to preheat and maintain the high density tube component at a temperature within 300° C. of its temperature of use, i.e. within 300° C. of the temperature of use of the transfer tube. Such a thermal gradient prevents significant deleterious effect on the high density tube at the temperature of use of the transfer tube.

Generally, the distribution of the wound heating element portion and the amount of heat which it must generate depends largely on the particular use of the transfer tube and is determined empirically. The amount of the wound portion of the heating element on the high density tube should be sufficient to generate the heat needed. Specifically, the electrical surface loading of the heating element or wire, i.e. the amount of electrical power per unit surface area of the heating element or wire, should be sufficient to generate the heat needed.

Generally, the temperature gradients in the high density tube can be controlled by the proper distribution of the wound heating element portion along its length. The concentration of the spaced windings or coils along the length of the high density tube can be substantially uniform, or it can be varied, provided such concentration or distribution produces the required thermal gradient in the high density tube at the temperature of use of the transfer tube. The wound portion of the heating element extends sufficiently along the length of the high density tube to be able to heat the entire high density tube. Generally, the wound portion of the heating element extends along substantially the entire length, or the entire length, of the high density tube component.

The thermal gradient of the high density tube component in the present transfer tube can be determined in a conventional manner. For example, a thermocouple can be passed through the heated tube and the temperature can be recorded as a function of position in the tube.

Briefly stated, one embodiment of the present process for producing an integral transfer tube useful for transfer of molten metal comprised of a high density hollow tube, a continuous elongated heating element and a polycrystalline shell with a maximum density of about 80% of theoretical, said heating element being comprised of a heating wound portion and two end portions wherein the wound portion is in direct contact with the outer surface wall of said high density tube and wherein at least a sufficient amount of said end portions are exposed for electrical attachment, said shell surrounding said wound portion of said heating element and the outer surface wall of said high density tube leaving no significant portion thereof exposed, comprises providing a high density polycrystalline hollow tube having a density of at least about 90% of its theoretical density and being comprised of ceramic oxide, providing a continuous elongated heating element comprised of a metal or metal alloy having a melting point higher than 700° C. and at least 200° C. higher than the temperature of use of said transfer tube, forming a structure comprised of said high density tube and said heating element wherein said wound portion of said heating element is in direct contact with said outer wall of said high density tube and said end portions extend therefrom sufficiently to expose a sufficient amount thereof from said transfer tube for electrical attachment, providing particulate ceramic oxide material which sinters to form said shell, providing a mold having a closed end portion and an open end portion and an inner wall sufficient to enable formation of said shell of said transfer tube, disposing said structure in said mold to form between the outer surface wall area of said structure and said inner wall of said mold a space for receiving said shell-forming particulate material, depositing said shell-forming particulate material in said space between said structure and inner wall of said mold to form a body of freely deposited particulate material, said shell-forming particulate material being deposited in an amount sufficient to form said shell, heating the resulting assembly to a temperature at which said shell-forming material sinters to produce said transfer tube, said sintering being carried out in an atmosphere or a partial vacuum which has no significant deleterious effect on said assembly, said mold having no significant deleterious effect on said transfer tube, said wound portion of said heating element being electrically characterized as having an electrical resistance and a surface area sufficient to preheat and maintain said high density tube at a temperature within 300° C. of its temperature of use.

The sinterable ceramic oxide particulate material used to form the shell, i.e. the shell-forming powder, can range in particle size but should be of a size or size distribution, determined empirically, which will produce the desired sintered shell. In one embodiment, the shell-forming powder is comprised of coarse particles generally ranging in size from about 15 microns to about 40 microns. In another embodiment, the shell-forming powder is comprised of particles of distributed size, usually mixtures of fine and coarse powders, generally ranging from about one micron to about 100 microns. Fine powder alone, i.e. powder having a size of less than about 10 microns, is not useful for producing the low density shell.

The shell-forming powder can vary widely in composition depending largely on the particular low density shell desired. It should be of a composition which produces the desired shell directly bonded to the outer surface wall of the high density tube. For example, it may be comprised of ceramic oxide powder alone, or of a mixture of the ceramic oxide powder and a sufficient amount of a sintering agent therefor determined empirically. Generally, the shell-forming powder is selected from the group consisting of alumina, beryllia, magnesia, magnesium aluminate, magnesium aluminate-forming compositions of magnesia and alumina, mullite, mullite-forming compositions of alumina and silica, yttria, zirconia, and mixtures thereof. The sinterable zirconia particulate material would include a stabilizing agent therefor as is well-known in the art.

In carrying out the present process, a mold is provided which is of a size and shape that will accommodate the production of the transfer tube. Generally, the mold has two opposed end portions, i.e., a closed end portion and an open end portion. Frequently, the mold is in the form of a hollow cylinder closed at one end and open at the opposite end. The length of the mold wall should be at least sufficient to enable the formation of the desired shell. In one embodiment, the mold wall has two holes at least sufficient to enable the end portions of the heating element to protrude therethrough.

The mold should have no significant deleterious effect in the present process or on the resulting transfer tube. At least the molding surface, and preferably the entire mold, is substantially chemically inert with respect to the ceramic oxide components used to form the transfer tube. The molding surface should not adhere to the ceramic oxide components used to form the transfer tube. Preferably, the molding surface is comprised of boron nitride, and more preferably, the entire mold is comprised of boron nitride. If the mold is not chemically inert with respect to the heating element, there should be no direct contact therebetween. In such instance, to prevent contact between the end portions of the heating element and the mold, a sleeve of a polycrystalline ceramic oxide can be placed on each such end portion to insulate it from the mold and also to provide support therefor. The mold should be substantially chemically inert with respect to the ceramic oxide sleeve which preferably is comprised of polycrystalline alumina.

FIG. 7 illustrates a preferred assembly useful for producing the present transfer tube. The structure 101 comprised of high density tube 102, heating element wire, and coating 104 of ceramic oxide particles directly on its outer surface wall 110 is centrally disposed in mold 105 which is closed at its bottom end portion 106 and open at its upper end portion 107. Shell-forming powder 108 is disposed in the space between structure 101 and molding wall 109 of mold 105. The heating element is comprised of helically wound portion 111 and end portions 112 and 113. Ceramic oxide sleeves 100 and 103 cover part of end portions 112 and 113 and are supported in notches in the mold.

Solid boron nitride tubing is commercially available and can be used to construct a mold similar to that shown in FIG. 7. For example, the commercially available boron nitride tube can be hollowed out by machining in a conventional manner and provided with a slab of boron nitride to form the bottom portion 106. However, commercially available boron nitride pieces frequently contain boron oxide and may contain other materials which would stick to the shell-forming powder during sintering and prevent production of the transfer tube. Therefore, before use, commercially available boron nitride pieces preferably are baked to remove material therefrom sufficiently which would cause sticking to the molding surface. Generally, baking of the boron nitride pieces in a partial vacuum of about 0.2 torr at a temperature of about 1900° C. for about one hour is sufficient to produce the desired non-sticking molding surfaces.

Generally, in carrying out the present process, the structure, which in one embodiment is comprised of the high density tube and heating element, is substantially centrally disposed in the mold in a manner which would enable formation of the shell on its outer surface wall area substantially uniformly. In another embodiment, the structure is comprised of the high density tube and the heating element with a coating of polymer on the wound heating element portion and the outer wall of the tube. In another embodiment, the structure is comprised of the high density tube and heating element with a coating of the cementing ceramic oxide particles on the wound heating element portion and on the outer wall of the high density tube. The shell-forming powder is deposited in the space between the outer surface wall area of the structure and the inner wall of the mold to produce a freely deposited body of powder which shrinks away from the inner surface of the mold without restriction during sintering. The shell-forming powder is gently loaded into its space in the mold to surround and be in direct contact with the outer surface wall area of the structure and be in direct contact with the inner wall of the mold. Generally, the shell-forming powder fills, or substantially fills, such space. No compressional force should be applied to the powder. Should a compressional force be applied to the powder in the mold and then removed, some of the cOmpressed powder will spring back, but some will remain physically bonded together, thereby creating fissures in the body of powder which on sintering will produce a sintered body with deleterious cracks, or which is in the form of islands. In contrast, the present shell is an integral body free of cracks, or free of significantly deleterious cracks, i.e. cracks which expose the outer surface wall area of the structure. Therefore, in the present process, the shell-forming powder is loaded into the mold so that the resulting body of powder in the mold is free of fissures which would prevent the production of the present continuous shell.

The resulting assembly, an example of which is shown in FIG. 7, can be placed in a conventional sintering furnace, such as a molybdenum furnace, where the shell-forming powder is sintered to produce the present transfer tube. Any particles of cementing ceramic oxide would also sinter in the production of the present transfer tube. Specifically, the coating of cementing ceramic oxide particles used to maintain the heating element in place would become directly bonded to the outer surface wall of the high density tube with which they were in contact and would become directly bonded to the shell. Also, cementing ceramic oxide particles in contact with each other would bond directly to each other. Sintering is carried out in an atmosphere which has no significant deleterious effect on the process or the resulting transfer tube. Preferably, the sintering atmosphere is non-oxidizing with respect to boron nitride. Representative of a useful gaseous atmosphere is a noble gas such as argon. Generally, the gaseous sintering atmosphere is at about or below atmospheric pressure. Generally, the vacuum ranges from below atmospheric pressure to about 0.1 torr.

Sintering is carried out at a temperature and for a period of time, determined empirically, which will densify, i.e. sinter, the shell-forming powder to produce a shell of desired low density. Generally, the sintering temperature ranges from about 1000° C. to about 1900° C., frequently from about 1600° C. to about 1850° C., with the particular sintering temperature depending largely on the particular material being sintered. Generally, sintering is completed in less than one hour. Generally, the shell-forming powder sinters substantially anisotropically, i.e. generally it undergoes significant radial shrinkage but no significant longitudinal shrinkage.

The resulting sintered structure, i.e. transfer tube, is cooled at a rate which has no significant deleterious effect thereon, i.e. cooling should be carried out at a rate which prevents cracking of the transfer tube. The transfer tube may be furnace cooled. Generally, it is cooled in the same atmosphere or vacuum in which sintering was carried out. Generally, it is cooled to about room temperature, i.e. from about 15° C. to about 30° C.

FIG. 8 illustrates the assembly of FIG. 7 after sintering has been carried out. FIG. 8 shows transfer tube 201 comprised of high density tube 202, heating element, polycrystalline ceramic oxide coating 204 and low density shell 205. The heating element is comprised of wound portion 206 and end portions 207 and 208. Ceramic oxide sleeves 200 and 203 are sleeved on parts of end wire portions 207 and 208. An end portion of sleeves 200 and 203 is within and directly bonded to shell 205. Wound portion 206 is in direct contact with outer wall 209 of high density tube 202. Coating 204 covers wound portion 206 and is directly bonded to outer wall 209. Shell 205 is directly bonded to coating 204 and may also be directly bonded to wall 209 depending largely on the porosity of coating 204. FIG. 8 illustrates that no bonding or sticking has occurred between molding wall 210 of mold 211 and shell 205.

In the present transfer tube, the structure comprised of the high density tube and the wound portion of the heating element which may include a polycrystalline coating of the cementing ceramic oxide on its outer surface wall area is surrounded by the low density shell. Generally, the low density shell, as well as any polycrystalline coating of the cementing ceramic oxide, has a thermal expansion coefficient which is within ±25%, preferably within ±10%, or within ±5%, of that of the high density tube. Most preferably, the low density shell, as well as any polycrystalline coating of the cementing ceramic oxide, has a thermal expansion coefficient which is the same as, or not significantly different from, that of the high density tube.

The low density shell has a thermal conductivity which is always significantly lower than that of the high density tube and which depends largely on the application of the resulting transfer tube. The shell has a thermal conductivity, determined empirically, which is sufficiently low to prevent formation of a significantly deleterious high thermal gradient through the wall of the high density tube. Generally, the present shell prevents cracking off, or significant cracking off, of fragments of the high density tube into the passing molten metal. The shell, through its low thermal conductivity and direct bonding to the high density tube, or direct bonding to any polycrystalline coating of the cementing ceramic oxide which in turn is directly bonded to the high density tube, or direct bonding to the polycrystalline coating and to the wall of the high density tube depending on the porosity of the coating, physically reduces the thermal gradients through the wall of the high density tube sufficiently for the present transfer tube to be useful for transfer of molten metal. The direct bonding of the shell to the high density tube, and/or to the polycrystalline coating of cementing ceramic oxide, facilitates constraint of the high density tube and transfer of beneficial, biaxial compressive stresses to the high density tube. Thermal gradients which would be significantly deleterious to the high density tube have no significant deleterious effect on the low density shell because of its lower elastic modulus and higher toughness. Generally, the thermal conductivity of the shell ranges from about 10% to about 90% lower, or from about 20% to about 50% lower, than that of the high density tube.

Also, the thermal conductivity of any polycrystalline coating produced by sintering of cementing ceramic oxide particles is lower than that of the high density tube. The thermal conductivity of this polycrystalline coating should have no significant deleterious effect on the maintenance of the desired thermal gradients in the high density tube by the shell. Generally, the thermal conductivity of such polycrystalline coating ranges from about 10% to about 90% lower, or from about 20% to about 50% lower, than that of the high density tube. Preferably, the polycrystalline coating of cementing ceramic oxide material has a thermal conductivity which is not significantly different from that of the shell.

The low density shell has a density which depends largely on the particular application of the transfer tube and is determined empirically. Generally, for a low density shell of given chemical composition, the larger its volume of pores, the lower is its thermal conductivity. Generally, the low density shell has a density ranging from about 40% to about 80%, frequently from about 50% to about 70%, or from about 60% to about 65%, of its theoretical density. Porosity in the low density shell is interconnecting.

The grain size of the low density shell may vary depending largely on the porosity desired therein. Frequently, the grain size of the shell does not differ significantly, or does not differ more than 20%, from the size of the starting particles. The grains may be of a distributed size generally ranging from about 5 microns to about 100 microns or from about 10 microns to about 90 microns. Generally, average grain size of the shell ranges from about 10 microns to about 80 microns, or from about 10 microns to about 70 microns.

The low density shell can vary widely in shape. It has a minimum wall thickness which depends largely on the particular application of the transfer tube and is determined empirically. Its minimum wall thickness should be sufficient to prevent deleterious effect, or significant deleterious effect, of the high density tube when molten metal is passed therethrough. Generally, the minimum wall thickness of the shell is about 1 millimeter. The maximum wall thickness of the low density shell can be as large as desired. Generally, the wall thickness of the low density shell ranges from about 1 millimeter to about 100 millimeters, or from about 2 millimeters to about 50 millimeters, or from about 3 millimeters to about 10 millimeters.

The low density shell is an integral body. Generally, it covers the outer surface wall of the high density tube leaving no significant portion thereof exposed. For example, if desired, an end portion or both end portions of the high density tube may be left exposed in the resulting transfer tube if necessary to fit it into a particular device. Preferably, the low density shell leaves none, or substantially none, of the outer surface wall of the high density tube exposed.

The low density shell is comprised of ceramic oxide material whose composition can vary depending largely on the particular application of the transfer tube and is determined empirically.

Preferably, the low density shell is comprised of ceramic oxide material selected from the group consisting of alumina, berrylia, magnesia, magnesium aluminate, mullite, yttria, zirconia and mixtures thereof. The zirconia is stabilized zirconia generally comprised of the cubic structure, or a combination of the cubic, monoclinic and tetragonal structures.

The density of any polycrystalline sintered coating formed from the cementing ceramic oxide particles can vary widely depending largely on the particular amount of such particles used. Generally, the density of this polycrystalline coating ranges from about 30% to about 80%, frequently from about 50% to about 70%, of its theoretical density. Porosity in this polycrystalline coating is interconnecting. Depending on the extent of porosity in this polycrystalline coating, the shell component, in addition to being directly bonded to the polycrystalline coating, may be in direct contact with the wound portion of the heating element and may be directly bonded to the outer surface wall of the high density tube.

Generally, the grain size of this polycrystalline coating of cementing oxide material does not differ significantly, or does not differ more than 20%, from the size of the starting cementing oxide particles. Generally, the thickness of this coating ranges from about 100 microns to no more than about two times the thickness of the heating element, i.e. a maximum thickness of about 1500 microns. Preferably, the thickness of this polycrystalline coating is about the same as that of the heating element. Preferably, this polycrystalline coating is comprised of ceramic oxide material selected from the group consisting of alumina, beryllia, magnesia, magnesium aluminate, mullite, yttria, zirconia, mixtures thereof, and reaction products thereof formed with a member selected from the group consisting of magnesium oxide, calcium oxide, silica and mixtures thereof. Generally, the reaction products comprise less than about 5% by weight of the coating.

Also, in one embodiment, the present transfer tube contains within its shell at least an end portion of two polycrystalline ceramic oxide sleeves wherein each such sleeve surrounds part of each end wire portion of the heating element. The portion of each sleeve within the shell is directly bonded to the shell. The sleeve can be comprised of any ceramic oxide of which the shell can be comprised and should be capable of becoming directly bonded to the shell in the present process. Preferably, the sleeve is a ceramic oxide material selected from the group consisting of alumina, berrylia, magnesia, magnesium aluminate, mullite, yttria, zirconia and mixtures thereof. Preferably, the sleeve has the same composition as the shell to which it is bonded. Most preferably, the sleeve is comprised of alumina. Also, in one embodiment, the sleeve surrounding the end wire portion extends through the shell up to the high density tube.

The present transfer tube is an integral body useful for transfer of molten metal, particularly alloys or superalloys. The present transfer tube is particularly useful for transfer of molten metal, alloy or superalloy at a temperature ranging from about 500° C. to less than 1900° C., or from above 1000° C. to less than 1900° C., of from about 1100° C. to about 1800° C., or from about 1300° C. to about 1600° C. Generally, the high density tube component of the transfer tube is preheated by its heating element to a temperature 25 within about 300° C. of that of the molten metal to be passed therethrough. Otherwise, cracking may occur in the high density tube component of the transfer tube.

The present transfer tube has no significant deleterious effect on molten metal, metal alloys or superalloys passed therethrough. The high density tube component is chemically inert, or substantially chemically inert, with respect to molten metal, metal alloy or superalloy passed therethrough.

Generally, the transfer tube is dimensionally stable, or substantially dimensionally stable, at the temperature of use. Preferably, none of the components of the transfer tube shrink, or shrink to any significant extent, at the temperature of use of the transfer tube.

The present invention permits the direct production of a transfer tube useful for transfer of molten metal. However, if desired, the transfer tube may be machined in a conventional manner to meet required specifications.

The present transfer tube is particularly useful in the steel industry for the casting of ingots.

The invention is further illustrated by the following examples wherein the procedure was as follows unless otherwise stated:

A resistance furnace with molybdenum heaters was Sintering and cooling were carried out in argon at about atmospheric pressure.

The sintered transfer tube was furnace-cooled to about room temperature, i.e. from about 15° C. to about 30° C.

Standard techniques were used to characterize the transfer tube.

EXAMPLE 1:

A commercially available high density hollow cylindrical tube of polycrystalline alumina was used. The tube had a density of about 99% of theoretical density and an average grain size of about 20 microns. The tube was cylindrical with a cylindrical passageway of the same cross-sectional area extending therethrough. The tube had an inner diameter of about 5 millimeters, a wall thickness of about 1 millimeter, an outside diameter of about 7 millimeters, and a length of about 54 millimeters.

The shell-forming powder was comprised of abrasive grade alumina particles having an average size of about 25 microns.

A mold of boron nitride was constructed. Specifically, a commercially available solid boron nitride rod having a diameter of about 25 millimeters was hollowed out by machining in a conventional manner to produce a hollow tube having a cylindrical passageway of substantially the same cross-sectional area extending therethrough. The hollowed boron nitride tube had an inner diameter of about 19 millimeters, a wall thickness of about 3 millimeters. Two distinct notches were cut out of one end of the wall to support a sleeved lead wire on each. Another piece of commercially available solid boron nitride rod was machined to form a substantially flat piece with a flanged periphery which was fitted into one end portion of the hollowed tube to form a mold with one closed end portion and one open end portion.

This mold was heated in a vacuum of about 0.1 torr at 1900° C. for one hour and then furnace cooled to room temperature. The mold sustained a weight loss of 6%. This heat treatment was designed to eliminate from the boron nitride any $B_2O_3$ which might cause adhesion of the alumina particles to the wall of the mold.

A commercially available molybdenum wire sold under the trademark Moly HT having a thickness of about 0.5 millimeters (20 mils) was used to form the heating element. The wire was tightly wound around a steel mandrel having an outside diameter of about 6 millimeters to produce a wound portion with two end portions extending therefrom. The wound portion of the heating element was then slid onto the outer surface wall of the high density tube. The wound heating element portion had sufficient spring to enable frictional engagement of the wall as is shown in FIG. 1. The wound heating element portion was comprised of about 40 coils substantially uniformly spaced from each other. The end portions of the heating element were spaced from the wound portion as is shown in FIG. 1. A polycrystalline alumina sleeve was placed on part of each end wire portion.

The resulting structure comprised of the high density tube and heating element with alumina sleeves was then substantially centrally disposed in the boron nitride mold. Each sleeved wire portion was supported on a notch in the mold. The length of the mold was slightly shorter than that of the high density tube leaving a small portion of the high density tube protruding therefrom. The wound heating element portion extended along substantially the entire length of the high density tube up to the top of the mold, i.e. up to slightly below the top surface of the mold. The shell-forming alumina powder was gently shaken into the space between the outer surface wall area of the structure and the inner wall of the mold to fill the space. The alumina powder in the mold was a freely deposited body of powder in direct contact with the outer surface wall area of the structure and the inner surface of the mold.

The resulting assembly was placed upright in the furnace, i.e. with the open end portion of the mold exposed to the furnace atmosphere, and heated at 30° C. per minute to a 10 minute isothermal hold at 1800° C. and then furnace cooled to room temperature.

Examination of the assembly showed that the alumina did not stick to the inner surface of the mold. After removal from the mold, the protruding portion of the high density tube was sliced off producing the transfer tube.

The resulting integral transfer tube is illustrated in FIG. 4. It was comprised of the high density tube, the heating element, a low density shell and the alumina sleeves. The shell was in direct contact with the wound portion of the heating element and was directly bonded to the outer surface wall of the high density tube leaving none of the wound heating element portion or the outer wall of the high density tube exposed. The shell was totally crack free. It appeared that the alumina powder had undergone approximately 10% radial shrinkage and essentially no longitudinal shrinkage. Decoupling of the freely deposited alumina powder from the boron nitride surface had allowed the powder to undergo substantially anisotropic shrinkage without cracking. The shell had a thickness of about 3 millimeters and appeared to have an average grain size of about 25 microns.

From other work, it was known that the shell had a density of about 60% of theoretical. The porosity in the shell was interconnecting.

A sufficient amount of both end portions of the heating element extended from the transfer tube for electrical attachment.

EXAMPLE 2:

In this example, the transfer tube illustrated in FIG. 5 was produced using the same materials and in the same manner as disclosed in Example 1, except as noted herein.

The structure comprised of the high density tube and heating element was produced in the same manner as disclosed in Example 1.

Cementing ceramic oxide powder sold under the trademark Alundum EA139 was used. The powder was comprised, on a weight basis, of about 99% of fused alumina, 0.7% silica, 0.1% calcium oxide, 0.1% iron oxide, and 0.3% sodium oxide. The powder had a particle size ranging from about 1 to about 125 microns with an average particle size in the range of about 70 to 80 microns.

The cementing powder was stirred with water to produce a slurry wherein the powder comprised about 50% by volume of the slurry. The slurry was brushed on the wound portion of the heating element and on the outer surface wall of the high density tube, and then dried in air. The resulting coating of the cementing ceramic oxide particles, which had about the same thickness as the wire, secured the spacing between the coils of the wound heating element portion and prevented contact between the wound portion and end portions of the heating element. This coated structure is illustrated in FIG. 2. A polycrystalline alumina sleeve was placed on part of each end wire portion.

A boron nitride mold was produced in substantially the same manner disclosed in Example 1.

The coated structure was then substantially centrally disposed in the boron nitride mold as illustrated in FIG. 7, leaving a small portion of only the coated high density tube protruding therefrom. Each sleeved wire portion was supported on a notch in the mold. The shell-forming alumina powder was gently shaken into the space between the outer surface wall area of the structure and the inner wall of the mold to fill the space, the resulting assembly was placed in the furnace and sintering was carried out as set forth in Example 1.

After sintering, examination of the assembly, which is illustrated in FIG. 8, showed that the alumina did not stick to the inner surface of the mold. After removal from the mold, the protruding portion of the coated high density tube was sliced off producing the transfer tube.

The resulting integral transfer tube was comprised of the high density tube, the heating element, a porous polycrystalline coating of the cementing ceramic oxide material, the low density shell and the alumina sleeves.

Microscopic examination indicated that the polycrystalline coating of cementing material was in direct contact with the wound portion of the heating element and was directly bonded to the outer surface wall of the high density tube and to the shell. Also, it appeared that because of the high porosity of the coating, part of the shell was directly bonded to the outer surface wall of the high density tube.

The shell was totally crack free. The shell left none of the wound portion of the heating element or the outer wall of the high density tube exposed.

It appeared that the alumina powder had undergone approximately 10% radial shrinkage and essentially no longitudinal shrinkage. Decoupling of the freely deposited alumina powder from the boron nitride surface had allowed the powder to undergo substantially anisotropic shrinkage without cracking. The shell had a thickness of about 3 millimeters and appeared to have an average grain size of about 25 microns.

From other work, it was known that the shell had a density of about 60% of theoretical. The porosity of the shell was interconnecting.

A sufficient amount of both end portions of the heating element extended away from the transfer tube for electrical attachment.

EXAMPLE 3:

In this example, the transfer tube illustrated in FIG. 6 was produced in a manner substantially the same as that disclosed in Examples 1 and 2, except as noted herein.

In this example, three commercially available high density hollow cylindrical tubes of polycrystalline alumina 25 were used. Each tube had a density of about 99% of theoretical density and an average grain size of about 20 microns. Each tube was cylindrical with a cylindrical passageway of the same cross-sectional area extending therethrough.

The largest diameter tube, tube 31 shown in FIG. 3, had an inner diameter of about 6.5 millimeters, a wall thickness of about 1.5 millimeters, an outside diameter of about 9 millimeters, and a length of about 30 millimeters.

The second tube, tube 32, had an inner diameter of about 5 millimeters, a wall thickness of about 0.7 millimeter, an outside diameter of about 6.25 millimeters, and a length of about 10 millimeters.

The third tube, tube 33, had an inner diameter of about 3 millimeters, a wall thickness of about 0.5 millimeter, an outside diameter of about 4 millimeters, and a length of about 30 millimeters.

An end portion of tube 32 was frictionally engaged within an end portion of tube 31 forming joint 34 therewith, and an end portion of tube 33 was frictionally engaged within an end portion of tube 32 forming joint 35 as shown in FIG. 3. The joints were about 3 to 4 millimeters in length. A cement paste was formed by mixing about 2 parts of the cementing powder disclosed in Example 1 with water. The paste was applied around the outside of joints 34 and 35 and dried in air. The resulting dried cement was sufficient to maintain the joints in place.

The molybdenum wire disclosed in Example 1 was used to form the heating element. The wire was doubled and wound directly on the outer surface wall of tube 33 along substantially the entire exposed length thereof producing a wound heating element portion in the form of a double helix as shown in FIG. 3. End wire portion 39 was then extended from the wound portion on tube 33 and winding was continued with the remaining wire forming a wound portion on tubes 32 and 31 along substantially the entire exposed lengths thereof producing a wound portion thereon in the form of a single helix. End wire portion 40 was then extended from the wound portion on tube 31. The wound heating element portion on tube 33 was comprised of about 14 spaced coils, on tube 32 it 0 was comprised of about 6 spaced coils and on tube 31 it was comprised of about 16 spaced coils.

A slurry of cementing oxide powder was formed as disclosed in Example 2 and brushed on the wound portion of the heating element and on the exposed outer walls of tubes 31, 32 and 33 and dried in air. The dried coating of cementing particles had about the same thickness as the wire and secured the spacing between the coils of the wound heating element portion. This coated structure is illustrated in FIG. 3.

A boron nitride mold was produced substantially as disclosed in Example 1. The mold had an inner diameter of about 19 millimeters. Two holes were formed through the wall of the mold to accommodate part of the end wire portions which were sleeved with polycrystalline alumina.

The coated structure was substantially centrally disposed in the mold and sleeved wire end portions 39 and 40 were supported by the holes in the mold. The shell-forming alumina powder, which was the same as disclosed in Example 1, was gently shaken into the space between the outer surface wall area of the structure and the inner wall of the mold to fill the space, the resulting assembly placed in the furnace and sintering carried out as set forth in Example 1.

After sintering, examination of the assembly showed that the alumina did not stick to the inner surface of the mold.

The resulting integral transfer tube was comprised of the high density tubes, the heating element, a porous polycrystalline coating of the cementing ceramic oxide material, the low density shell and the alumina sleeves.

Microscopic examination indicated that the polycrystalline coating of cementing material was in direct contact with the wound portion of the heating element and was directly bonded to the outer surface wall of the high density tube and to the shell. Also, it appeared that because of the high porosity of the coating, part of the shell was directly bonded to the outer surface wall of the high density tube.

The shell was totally crack-free. The shell left none of the wound portion of the heating element or the outer wall of the high density tube exposed.

It appeared that the alumina powder had undergone approximately 10% radial shrinkage and essentially no longitudinal shrinkage. Decoupling of the freely deposited alumina powder from the boron nitride surface had allowed the powder to undergo substantially anisotropic shrinkage without cracking. The shell had a thickness of about 5.5 millimeters at one end of the transfer tube, and a thickness of about 8 millimeters at the opposite end.

EXAMPLE 4:

This is a paper example.

The transfer tube produced in Example 3 is supported longitudinally by suitable means with its entrance end portion at the top and exit end portion at the bottom.

The end wire portions of the heating element are electrically attached to a power supply. Sufficient power is passed through the heating element, and the amount and distribution of the wound portion of the heating element is sufficient to preheat and maintain the high density tube component within 300° C. of the 1600° C. temperature of the molten metal to be passed therethrough.

Molten superalloy, at a temperature of 1600° C., is passed downwardly through the hot high density tube component. The liquid metal is caught in a crucible where it solidifies into an ingot.

What is claimed is:

1. A process for producing an integral transfer tube useful for transfer of molten metal comprised of a high density hollow tube, a continuous elongated heating element and a polycrystalline shell with a maximum density of about 80% of theoretical, said heating element being comprised of a heating wound portion and two end portions wherein the wound portion is in direct contact with the outer surface wall of said high density tube and wherein at least a sufficient amount of said end portions are exposed for electrical attachment, said shell surrounding said wound portion of said heating element and the outer surface wall of said high density tube leaving no significant portion thereof exposed, which comprises providing a high density polycrystalline hollow tube having a density of at least about 90% of its theoretical density and being comprised of ceramic oxide, providing a continuous elongated heating element comprised of a metal or metal alloy having a melting point higher than 700° C. and at least 200° C. higher than the temperature of use of said transfer tube, forming a structure comprised of said high density tube and said heating element wherein said wound portion of said heating element is in direct contact with said wall of said high density tube and said end portions extend therefrom sufficiently to expose a sufficient amount thereof from said transfer tube for electrical attachment, providing particulate ceramic oxide material which sinters to form said shell, providing a mold having a closed end portion and an open end portion and an inner wall sufficient to enable formation of said shell of said transfer tube, disposing said structure in said mold to form between the outer surface wall area of said structure and said inner wall of said mold a space for receiving said shell-forming particulate material, depositing said shell-forming particulate material in said space between said structure and inner wall of said mold to form a body of freely deposited particulate material, said shell-forming particulate material being deposited in an amount sufficient to form said shell, heating the resulting assembly to a temperature at which said shell-forming material sinters to produce said transfer tube, said sintering being carried out in an atmosphere or a partial vacuum which has no significant deleterious effect on said assembly, said mold having no significant deleterious effect on said transfer tube, said wound portion of said heating element being electrically characterized as having an electrical resistance and a surface area sufficient to preheat and maintain said high density tube at a temperature within 300° C. of its temperature of use.

2. The process according to claim 1, wherein said high density tube is comprised of ceramic oxide material selected from the group consisting of alumina, beryllia, magnesia, magnesium aluminate, mullite, yttria, zirconia, and mixtures thereof.

3. The process according to claim 1, wherein said shell is comprised of ceramic oxide material selected from the group consisting of alumina, beryllia, magnesia, magnesium aluminate, mullite, yttria, zirconia, and mixtures thereof.

4. The process according to claim 1, wherein a ceramic oxide sleeve surrounds a part of each end portion of said heating element to prevent it from contacting the mold.

5. The process according to claim 1, wherein said high density tube has a density ranging from about 90% to about 100% of its theoretical density.

6. The process according to claim 1, wherein said high density tube and said shell are comprised of alumina.

7. The process according to claim 1, wherein said mold is comprised of boron nitride.

8. The process according to claim 1, wherein said heating element is comprised of a member selected from the group consisting of chromium, iridium, molybdenum, nickel, osmium, palladium, platinum, rhodium, ruthenium, tantalum, tungsten and alloys thereof.

9. The process according to claim 1, wherein said sintering temperature ranges from about 1000° C. to about 1900° C.

10. A process for producing an integral transfer tube useful for transfer of molten metal comprised of a high density hollow tube, a continuous elongated heating element, a polycrystalline ceramic oxide coating and a polycrystalline shell with a maximum density of about 80% of theoretical, said heating element being comprised of a heating wound portion and two end portions wherein the wound portion is in direct contact with the outer surface wall of said high density tube and wherein at least a sufficient amount of said end portions are exposed for electrical attachment, said polycrystalline coating being in direct contact with said wound portion of said heating element and being directly bonded to the outer surface wall of said high density tube, said shell being directly bonded to said polycrystalline coating, which comprises providing a high density polycrystalline hollow tube having a density of at least about 90% of its theoretical density and being comprised of ceramic oxide, providing a continuous elongated heating element comprised of a metal or metal alloy having a melting point higher than 700° C. and at least 200° C. higher than the temperature of use of said transfer tube, forming a structure comprised of said high density tube and said heating element wherein said wound portion of said heating element is in direct contact with said wall of said high density tube and wherein said end portions extend therefrom sufficiently for said electrical attachment, depositing a slurry of cementing ceramic oxide particles on said wound portion of said heating element and on the outer surface wall of said high density tube, drying said deposited slurry forming a coating of said cementing ceramic oxide particles which maintains said wound portion of said heating element in place producing a coated structure, providing particulate ceramic oxide material which sinters to form said shell, providing a mold having a closed end portion and an open end portion and an inner wall sufficient to enable formation of said shell of said transfer tube, disposing said coated structure in said mold to form between the outer surface wall area of said coated structure and said inner wall of said mold a space for receiving said shell-forming particulate material, depositing said shell-forming particulate material in said space between said coated structure and inner wall of said mold to form a body of freely deposited particulate material, said shell-forming particulate material being deposited in an amount sufficient to form said shell, heating the resulting assembly to a sintering temperature at which said shell-forming material sinters to produce said transfer tube, at said sintering temperature said cementing ceramic oxide particles sintering to form said polycrystalline coating, said sintering being carried out in an atmosphere or a partial vacuum which has no significant deleterious effect on said assembly, said mold having no significant deleterious effect on said transfer tube, said wound portion of said heating element being electrically characterized as having an electrical resistance and a surface area sufficient to preheat and maintain said high density tube at a temperature within 300° C. of its temperature of use.

11. The process according to claim 10, wherein said high density tube is comprised of ceramic oxide material selected from the group consisting of alumina, beryllia, magnesia, magnesium aluminate, mullite, yttria, zirconia, and mixtures thereof.

12. The process according to claim 10, wherein said shell is comprised of ceramic oxide material selected from the group consisting of alumina, beryllia, magnesia, magnesium aluminate, mullite, yttria, zirconia, and mixtures thereof.

13. The process according to claim 10, wherein a ceramic oxide sleeve surrounds a part of each end portion of said heating element to prevent it from contacting the mold.

14. The process according to claim 10, wherein said high density tube has a density ranging from about 90% to about 100% of its theoretical density.

15. The process according to claim 10, wherein said high density tube and said shell are comprised of alumina.

16. The process according to claim 10, wherein said mold is comprised of boron nitride.

17. The process according to claim 10, wherein said sintering temperature ranges from about 1000° C. to about 1900° C.

18. The process according to claim 10, wherein more than about 95% by weight of said polycrystalline coating is comprised of a member selected from the group consisting of alumina, beryllia, magnesia, magnesium aluminate, mullite, yttria, zirconia, and mixtures thereof.

19. The process according to claim 10, wherein said heating element is comprised of a member selected from the group consisting of chromium, iridium, molybdenum, nickel, osmium, palladium, platinum, rhodium, ruthenium, tantalum, tungsten and alloys thereof.

* * * * *